(12) United States Patent
Batisse

(10) Patent No.: US 6,557,476 B2
(45) Date of Patent: May 6, 2003

(54) SYSTEM FOR SUPPLYING POWER TO ELECTRICALLY PROPELLED VEHICLES

(75) Inventor: Jean-Pierre Batisse, La Celle Saint-Cloud (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/044,906

(22) Filed: Jan. 15, 2002

(65) Prior Publication Data

US 2002/0096412 A1 Jul. 25, 2002

(30) Foreign Application Priority Data

Jan. 24, 2001 (FR) .......................................... 01 00951

(51) Int. Cl.$^7$ ............................................... B60L 11/00
(52) U.S. Cl. ........................ 104/289; 246/245; 105/35; 191/4; 191/33 R
(58) Field of Search ................... 105/35, 36; 318/140; 322/4; 320/120; 310/13; 307/20; 104/289; 191/2, 3, 4

(56) References Cited

U.S. PATENT DOCUMENTS

| | | | | |
|---|---|---|---|---|
| 714,157 A | * | 11/1902 | Davis | 104/289 |
| 714,196 A | * | 11/1902 | Kubierschky | 104/289 |
| 744,187 A | * | 11/1903 | Gibbs | 105/35 |
| 807,029 A | * | 12/1905 | Hoadley | 105/35 |
| 881,387 A | * | 3/1908 | Eastwood | 105/35 |
| 1,188,570 A | * | 6/1916 | Strobel | 105/36 |
| 1,216,694 A | * | 2/1917 | Jenkins | 104/287 |
| 5,260,637 A | * | 11/1993 | Pizzi | 320/103 |
| 5,517,923 A | * | 5/1996 | Cathiard | 104/173.1 |
| 5,796,175 A | * | 8/1998 | Itoh et al. | 307/10.1 |
| 6,252,760 B1 | * | 6/2001 | Amatucci | 361/503 |

FOREIGN PATENT DOCUMENTS

| | | |
|---|---|---|
| DE | 31 01 655 A | 12/1981 |
| EP | 0 982 176 A | 3/2000 |

OTHER PUBLICATIONS

P. W. Wheeler et al., "A Bi–Directional Rectifier For Use With A Voltage Fed Inverter In A High Performance Variable Speed AC Motor Drive System", EPE 95: 6$^{TH}$ European Conference Power Electronics and Applications, And Applications, EUROPEAN CONFERENCE ON POWER ELECTRONICS AND APPLICATIONS, BRUSSELS, EPE ASSOCIATION, B vol. & 1 Conf. 6, Sep. 19, 1995, pp. 1095–1100, XP 000537502.

* cited by examiner

Primary Examiner—Mark T. Le
(74) Attorney, Agent, or Firm—Sughrue Mion, PLLC

(57) ABSTRACT

A power supply system for an electrically propelled vehicle equipped with electric traction motors and including an autonomous power supply system which can be recharged on board the vehicle for supplying power to the electric traction motors. At least one station is provided with an electrical power supply system connected to a mains electrical power supply network and connection arrangements for electrically connecting the autonomous power supply system of the vehicle to the power supply system of the station, on approaching the station, in order to charge the autonomous power supply device when the vehicle is stopped in the station. The autonomous power supply system on board the vehicle includes a battery of supercapacitors and the power supply system of the station includes an energy accumulating kinetic system.

7 Claims, 2 Drawing Sheets

SYSTEM FOR SUPPLYING POWER TO ELECTRICALLY PROPELLED VEHICLES

BACKGROUND OF THE INVENTION

1. Field of the Invention

The invention relates to a system for supplying electrical power to electrically propelled public transport vehicles and in particular to supplying electrical power to trams.

2. Description of the Prior Art

Our patent application FR-A1 2 782 680 discloses a system for supplying power to electrically propelled vehicles enabling public transport vehicles, such as high-capacity trams, to circulate without an overhead line DC power supply. This kind of system includes an autonomous power supply system on board the vehicle consisting of an electric motor provided with a high-mass flywheel and stations with a mains electrical power supply for recharging the flywheel with energy.

This kind of flywheel on board a rail vehicle has the disadvantage of requiring a bulky suspension system for damping its strong gyroscopic torque, which can interfere with the dynamic behavior of the vehicle, and protection means to limit mechanical and thermal hazards in the event of a breakdown. What is more, in this kind of installation, the mains power supply at the stations is heavily loaded when recharging the flywheel during stops, which makes it obligatory to have powerful and costly electrical power supply infrastructures at the stations to prevent overloading the mains electrical power supply.

The invention therefore aims to remedy these disadvantages by proposing a system for supplying an electrically propelled vehicle with electrical energy that enables fast charging of an autonomous power supply device on board the vehicle with electrical power supply infrastructures at the stations of modest power that are simple and economical to produce.

SUMMARY OF THE INVENTION

The invention provides a power supply system for an electrically propelled vehicle equipped with electric traction motors including an autonomous power supply system which can be recharged on board the vehicle for supplying power to the electric traction motors, at least one station provided with an electrical power supply system connected to the mains electrical power supply network and connection means for electrically connecting the autonomous power supply system of the vehicle, on approaching the station, to the power supply system of the station in order to charge the autonomous power supply device when the vehicle is stopped in the station, characterized in that the autonomous power supply system on board the vehicle includes a battery of supercapacitors and in that the power supply system of the station includes an energy accumulating kinetic system.

Particular embodiments of the power supply system can have one of more of the following features, individually or in any technically feasible combination:

- the energy accumulating kinetic system recovers braking energy of the vehicle when the vehicle is approaching the station;
- the energy accumulating kinetic system supplies energy to the autonomous power supply system of the vehicle when the vehicle is accelerating on leaving the station;
- the connecting means consist of an overhead line in each station cooperating with a pantograph carried by the vehicle, with a return current path via the wheels and the rails.

The aims, aspects and advantages of the present invention will become clearer after reading the following description of one embodiment of the invention, which description is given by non-limiting example and with reference to the accompanying drawings.

DETAILED DESCRIPTION OF THE PREFERRED EMBODIMENTS

To make the drawings easier to read, they show only items needed to understand the invention.

Figure 1:
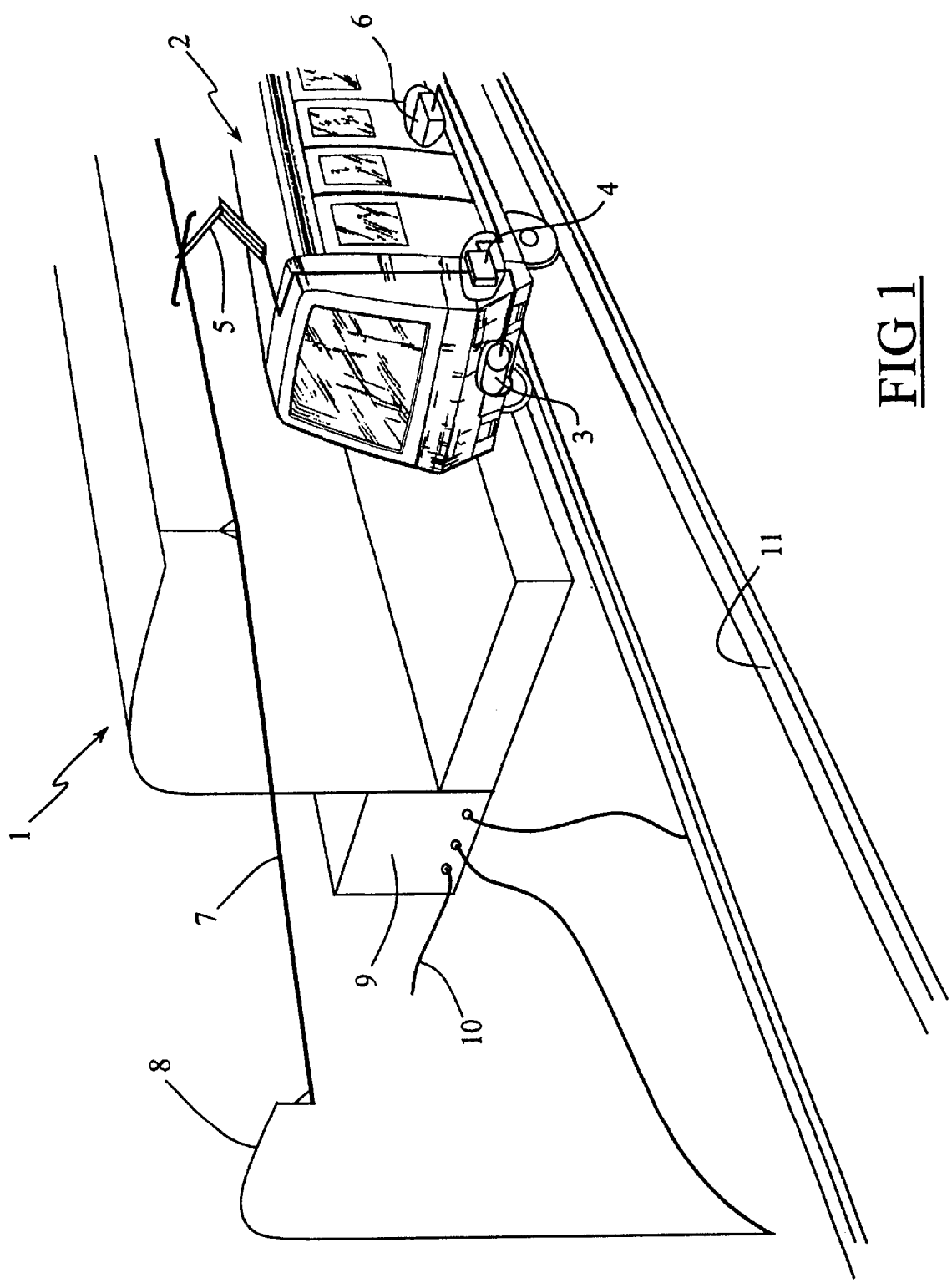
FIG. 1 is a diagrammatic perspective view of a station and a tram equipped with a power supply system according to the invention.

FIG. 1 shows a railway equipped with a station 1 in which a rail vehicle 2 in the form of a tram has stopped. The tram 2 is equipped with electric traction motors 3 which are connected to an electronic power circuit 4 based on insulated gate bipolar transistors (IGBT) 13 and is supplied with power conventionally from an overhead line 7 via a pantograph 5, with a return current path via one rail 11 of the track, and autonomously by an autonomous power supply system 6 on board the tram 2.

Figure 2:
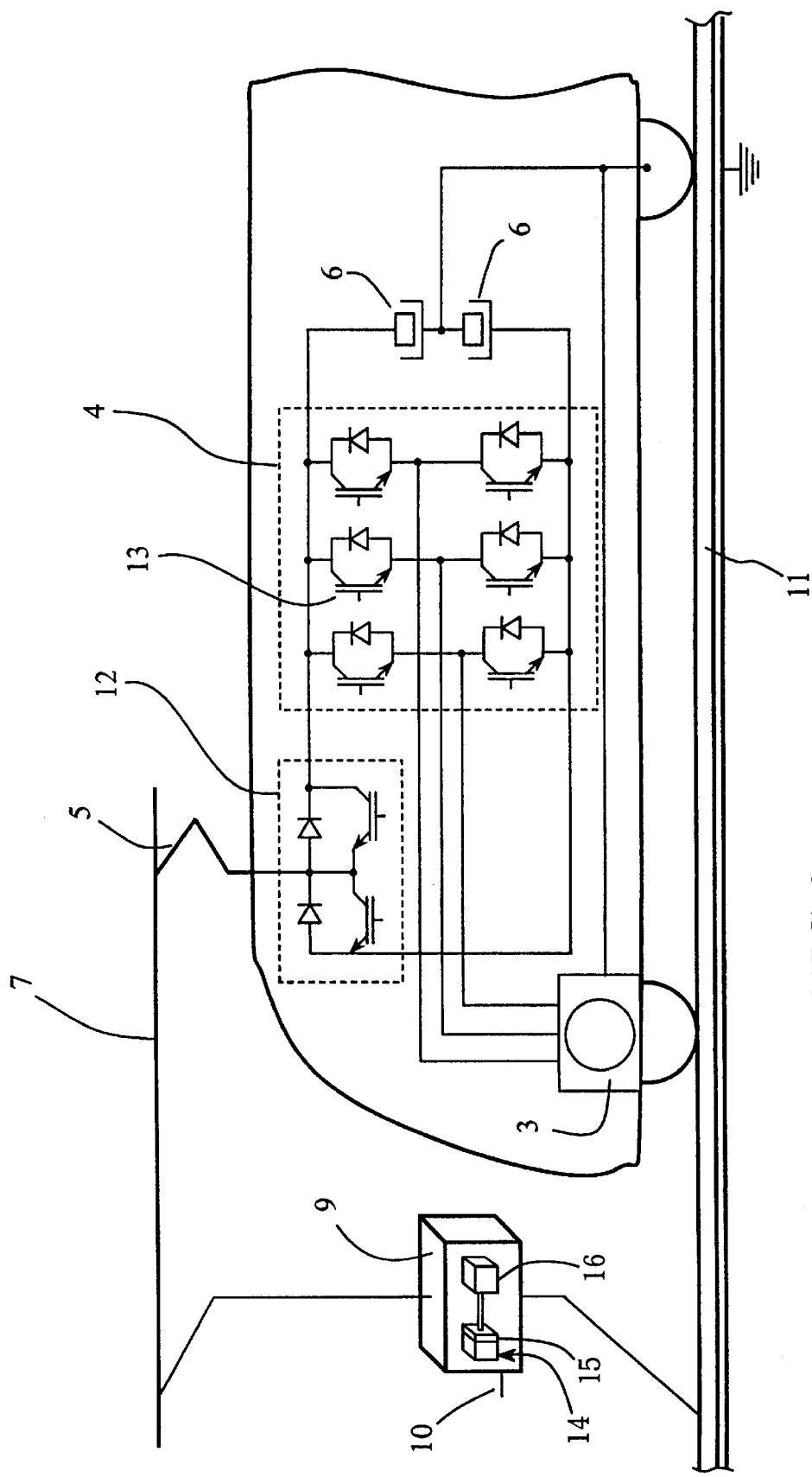
FIG. 2 is an electrical circuit diagram of the power circuit of the FIG. 1 power supply system.

As shown in FIG. 2, the pantograph 5 is associated with a rectifier electronic device 12 which regulates a unipolar average current if the overhead line 7 is fed with an alternating current voltage, for example by chopping or controlling conduction, and which conducts if the overhead line 7 is fed with power at a DC voltage in the conventional way. The traction motors 3 are reversible, i.e. they absorb electrical energy during traction and supply electrical energy during braking.

The autonomous power supply device consists mainly of a battery of supercapacitors 6, also referred to as double-layer capacitors, distributed within the structure of the tram 2 and capable of absorbing and restoring a large quantity of electrical energy at high speed and with high efficiency. This kind of supercapacitor is described in patent application WO 96/11/486, for example. The voltage of the autonomous power supply device 6 is fixed either at a value of the order of 750 V or at a value of the order of 1500 V if the vehicle is also designed to travel over portions of conventional rail tracks.

As shown in FIG. 1, the station 1 includes a canopy which carries the cable of the overhead line 7 above the track, the overhead line 7 being adapted to cooperate with the pantograph 5 of the tram 2 to charge the autonomous power supply system 6 while the tram 2 is stopped in the station 1. The overhead line 7 preferably extends several tens of meters from one end of the station 1 to the other to enable the pantograph 5 to be connected to the overhead line 7 while the tram 2 is accelerating and decelerating on approaching and leaving the station 1. At the entry and exit ends of the station 1 the end of the overhead line 7 is supported by a pylon 8 at a height slightly greater than the height of the cable of the overhead line 7 in the station 1, to form a progressive slope for respectively engaging and disengaging the pantograph 5 as the tram 2 approaches and leaves the station 1.

The overhead line 7 is powered by an energy accumulating kinetic system 9 including an electromechanical flywheel device consisting for example of an asynchronous generator/motor 14 or a permanent magnet synchronous motor 14 whose rotor 15 drives a flywheel 16 which rotates in low-friction bearings such as magnetic bearings or more economical ceramic bearings in a vacuum. In one embodiment the flywheel can be driven by the combination of an asynchronous motor and a synchronous motor, the asynchronous motor acting as a motor when supplied with power by the three-phase current and the synchronous motor then supplying a single-phase current supplying the overhead line 7. The output voltage of the energy accumulating kinetic system 9 is fixed at a value close to that of the autonomous power supply device 6 in order to enable identical operation of the power circuit 4 of the traction motors 3 whether fed directly by the capacitor battery 6 on board the tram 2 or via the pantograph 5 and the overhead line 7 by the energy accumulating kinetic system 9 of a station 1.

The energy accumulating kinetic system 9 is connected to an electrical power distribution network 10 which progressively drives the rotor of the motor with low power consumption when there is no tram 2 in the station 1.

The operation of the tram power supply system will now be described.

When the tram 2 is between two stations 1, in an area not equipped with an overhead line 7, the pantograph 5 is either lowered or fully extended and the traction motors 3 are supplied with power via the power circuit 4 by the autonomous power supply system, in particular by the battery of supercapacitors 6, which are therefore progressively discharged.

During this phase of autonomous operation of the tram 2, the energy accumulating kinetic system 9 of each station 1 is connected to the electrical power supply network 10 so that the flywheel is progressively charged with energy at low power consumption.

When the tram 2 is approaching a station 1, the pantograph 5 is moved to a ready height, if necessary under the control of the driver, the ready height being slightly less than the height of the cable of the overhead line 7 at the level of the first pylon 8 of the station 1.

Near the station 1 the pantograph 5 in the ready position touches the cable of the overhead line 7 of the station 1 shortly after passing the first pylon 8, at a moment which substantially corresponds to the start of braking of the tram 2. During the braking phase, the traction motors 3 supply energy which is either transferred quickly via the pantograph 5 and the overhead line 7 to the energy accumulating kinetic system 9 of the station 1, so increasing the speed of rotation of the flywheel by the motor previously acting as a generator, without transferring energy to the electrical network 10, or more conventionally conserved on board the vehicle and transferred to the battery of supercapacitors 6; a combination of these two solutions is likewise feasible.

When the tram 2 is stopped in the station 1 to enable passengers to board and alight, an inverse transfer of energy occurs between the energy accumulating kinetic system 9 and the tram 2, energy being sent to the autonomous power supply system of the tram 2 to charge or top up the charge in the battery of supercapacitor 6. Because of the energy accumulating kinetic system 9, a large quantity of energy can be transferred quickly to the battery of supercapacitors 6 without overloading the electrical power supply network 10, the energy transferred being taken from the kinetic energy of the flywheel.

The tram 2 then begins to leave the station 1 and during this phase the traction motors 3 are powered by the overhead line 7 and mainly receive energy from the energy accumulator kinetic system 9 and, to a lesser degree, energy supplied by the electrical power supply network 10 of the station 1. During this starting phase, the energy available on the overhead line 7 is also used to maintain the charge in the battery of supercapacitors 6.

When the tram 2 is accelerating and the pantograph 5 reaches the end of the overhead line 7, which advantageously corresponds to the tram 2 reaching its cruising speed, the power circuit 4 detects the interruption in the supply of energy from the overhead line 7 and then commands the supply of energy to the traction motors 3 by the autonomous power supply system 6 until the tram 2 reaches the next station 1.

During this phase of autonomous operation of the tram, the energy accumulating kinetic system 9 of the station 1 previously loaded is charged at low power from the electrical power supply network 10, until the next tram 2 arrives.

This kind of power supply system has the advantage of enabling fast charging of the autonomous power supply system of the tram from low power electrical power supply networks at stations.

Also, maintaining the supply of power via the overhead line during the highly energy-consuming stage of acceleration of the tram away from a station has the advantage of significantly increasing the autonomy of the tram on autonomous power or reduces the overall size and cost of the battery of supercapacitors, the energy consumed during this phase then being used mainly to maintain the tram at cruising speed.

The use of an autonomous power supply system on board the vehicle based on supercapacitors adapted to be distributed in the structure of the vehicle also optimizes the behavior of the vehicle and has the advantage of offering great ruggedness and high tolerance to the vibration and motion usually encountered on board rail vehicles.

Of course, the invention is in no way limited to the embodiment described and shown, which has been provided merely by way of example. It can be modified without departing from the scope of the invention, in particular from the point of view of the construction of the various components or by substituting technical equivalents.

Accordingly, in one variant the battery of supercapacitors can be associated with conventional batteries to increase the storage capacity of the autonomous power supply system or to constitute a back-up autonomous system.

Accordingly, in another variant, not shown, the connecting means providing the electrical connection of the autonomous power supply system to the power supply system of the station on approaching and leaving each station can consist of a rail/shoe system.

Accordingly, in another variant the vehicle could be a road vehicle and run on tires, provided that it is guided on approaching and leaving the station and has a pair of electrical power pick-up devices, such as lateral rails, also providing guidance, or a virtually contactless power supply system, such as a mutual induction system operating in stations, for example, at the frequency generated by the energy accumulating kinetic system.

There is claimed:

1. A power supply system for an electrically propelled vehicle equipped with electric traction motors, including an autonomous power supply system which is operative to be recharged on board said vehicle for supplying power to said electric traction motors, at least one station provided with an electrical power supply system connected to a mains electrical power supply network and connection means for electrically connecting said autonomous power supply system of said vehicle, on approaching said station, to said power supply system of said station in order to charge said autonomous power supply device when said vehicle is stopped in said station, wherein said autonomous power supply system on board said vehicle includes a battery of supercapacitors and in that said power supply system of said station includes an energy accumulating kinetic system.

2. The system claimed in claim 1 for supplying power to an electrically propelled vehicle, wherein said energy accumulating kinetic system recovers braking energy of said vehicle when said vehicle is approaching said station.

3. The system claimed in claim 1 for supplying power to an electrically propelled vehicle, wherein said energy accumulating kinetic system supplies energy to said autonomous power supply system of said vehicle when said vehicle is accelerating on leaving said station.

4. The system claimed in claim 1 for supplying power to an electrically propelled vehicle, wherein said connecting means consist of an overhead line in each station cooperating with a pantograph carried by said vehicle.

5. A power supply system for an electrically propelled vehicle equipped with electric traction motors, including an autonomous power supply system which is operative to be recharged on board said vehicle for supplying power to said electric traction motors, at least one station provided with an electrical power supply system connected to a mains electrical power supply network, said electrical power supply system of said at least one station being coupled to a pantograph, said pantograph electrically connecting said autonomous power supply system of said vehicle, on approaching said station, to said power supply system of said station in order to charge said autonomous power supply device when said vehicle is stopped in said station, wherein said autonomous power supply system on board said vehicle includes a battery of supercapacitors and in that said power supply system of said station includes an energy accumulating kinetic system, said energy accumulating kinetic system comprising at least one of an asynchronous generator/motor and a synchronous motor; wherein, said at least one of an asynchronous generator/motor and a synchronous motor includes a rotor driving a flywheel.

6. The system claimed in claim 5 for supplying power to an electrically propelled vehicle, wherein said energy accumulating kinetic system recovers braking energy of said vehicle when said vehicle is approaching said station.

7. The system claimed in claim 5 for supplying power to an electrically propelled vehicle, wherein said energy accumulating kinetic system supplies energy to said autonomous power supply system of said vehicle when said vehicle is accelerating on leaving said station.

* * * * *